Feb. 22, 1944.  L. A. OHLINGER  2,342,482
VALVE
Filed Dec. 31, 1940

Inventor:
Leo A. Ohlinger
By Everett A. Johnson
Attorney.

Patented Feb. 22, 1944

2,342,482

UNITED STATES PATENT OFFICE 2,342,482

VALVE

Leo A. Ohlinger, Chicago, Ill., assignor to Standard Oil Company, Chicago, Ill., a corporation of Indiana Application December 31, 1940, Serial No. 372,537

2 Claims. (Cl. 221—116)

This invention relates to an improved valve and more particularly to an improved valve for the transfer of solid particles, granular or powdered, from one zone to another. It also relates to methods and apparatus for valving and metering the flow of comminuted solids.

In the catalytic conversion of hydrocarbons it frequently is necessary to transfer measured amounts of granular or powdered catalyst material from one location to another. This is particularly true in low velocity up-flow catalyst technique wherein catalyst is introduced into an oil vapor line and the mixture of oil vapors and catalyst is introduced into a low velocity upflow reactor, the catalyst recovered and ultimately returned to the catalyst zone. The vapors and catalyst pass upwardly within the reactor at different rates and the rate of flow of the catalyst is dependent upon several factors including particle size. Therefore it is necessary that there be no attrition of the catalyst by grinding or pulverizing as it is transferred. Similar difficulties arise in moving bed operations wherein the catalyst is removed from the process as the catalyst becomes spent and is regenerated outside the unit. It is necessary in transferring the catalyst from one zone of operation to another that the reacting gases or regeneration gases be retained within the reactor. Likewise it is desired that metered amounts of catalyst be transferred to or from the reactor.

It is an object of my invention to provide methods and apparatus effective to give positive control and regulation of the flow of solid particles without attrition. It is a further object of my invention to provide a valve which permits transfer of granular or powdered material from one pressure zone to a higher or lower pressure zone. Still another object is to provide a valve for the introduction of one or more catalysts to a reaction zone without loss of the gaseous reactants. A further object is to provide a valve adapted to be continuously adjusted to compensate for wear. Another object of my invention is to provide a valve simple in design, economical in construction and efficient in operation. Further objects of my invention will be apparent from the following description read in conjunction with the accompanying drawing forming a part of this specification and wherein:

Figure 1:
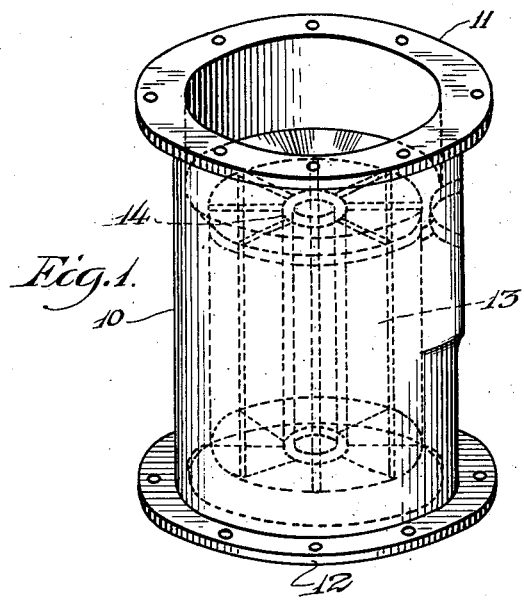
Figure 1 is a view in perspective of a preferred embodiment of my invention.
Figure 5:
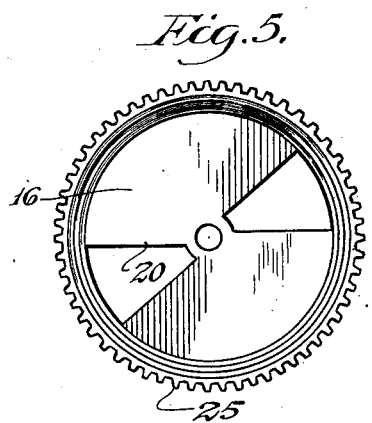
Figures 4 and 5 show certain details of my apparatus, Figure 4 showing the relative position of the ports and Figure 5 showing the top disc.
Figure 4:
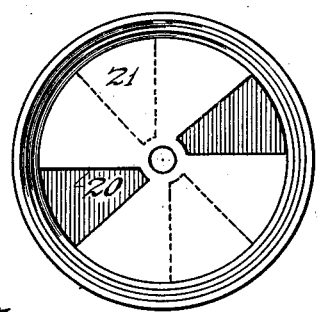
Figure 2:
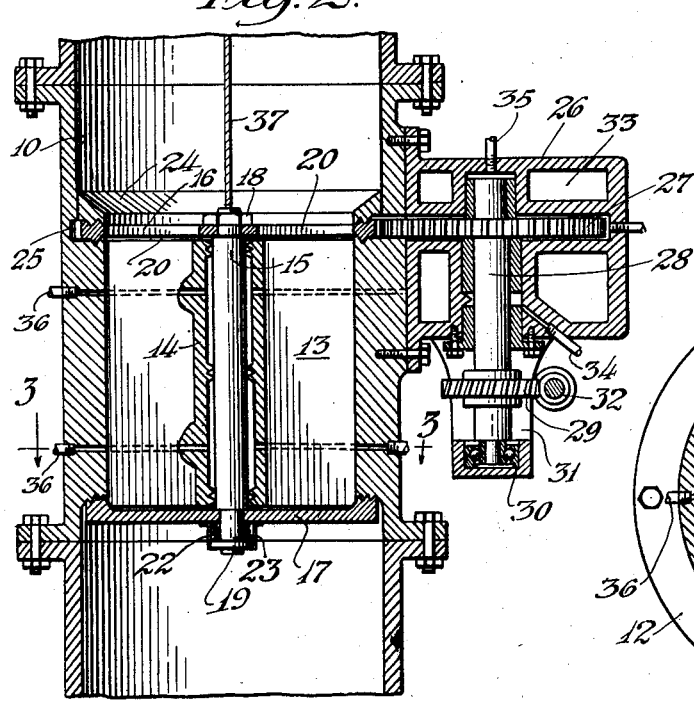
Figure 2 is a vertical section showing the assembly of my valve.
Figure 3:
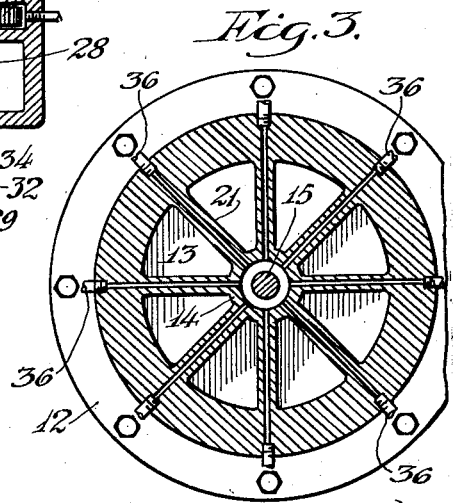
Figure 3 is a horizontal section taken along the line 3—3 of Figure 2.

Referring now more in detail to Figures 1 and 2, the valve body comprises a cylindrical shell 10 which can be provided with flanges 11 and 12 at its upper and lower ends, respectively. The shell 10 is divided into a plurality of segments by partitions 13 fixed to the shell 10 and terminating in hub 14. Spring loaded shaft 15 is threaded at both ends with a top disc 16 and a bottom disc 17 held fixed to the shaft and relative to each other by nuts 18 and 19. The discs 16 and 17 are provided with openings 20 and 21 as shown in Figures 4 and 5 and are adapted to rotate about shaft 15. The pair of openings 20 in the top disc permit the material to enter the sections and the pair of openings 21 in the bottom disc are for delivery of the material to the lower zone which can communicate for example with a catalyst accumulation zone, a reactor or regenerator, or a transfer line leading to one of them. The discs 16 and 17 are mounted with the openings or ports 20 and 21, for example 90 degrees apart, so that the balance of each disc covers the ends of the remaining sections, the alternate filled or dead zones serving to maintain a positive seal against the passage of gases through the valve. By having a plurality of sections the flow of material is uniform. Likewise the number of ports can be increased. Annular guide ring 24 over the rim of disc 16 is fixed to shell 10 or otherwise.

Spring 22 on the lower end of the valve shaft 15 urges the lower disc 17 upward and draws the upper disc 16 downward thereby compensating for wear and maintaining the seal. The spring 22 can be protected by a suitable flexible cover 23.

As shown in Figures 2 and 5 the disc 16 is provided with gear teeth 25 on the rim and the two discs 16 and 17 are rotated by gearing the drive directly to the rim 25. It is contemplated, however, that the discs can be rotated by a drive upon an extension of the shaft 15.

In the embodiment shown in the drawing, the gear housing 26 is bolted to the shell 10. Gear 27 is fixed to shaft 28 which in turn carries drive gear 29 and is supported by outboard bearing 30 in bracket 31 bolted to gear housing 26. A worm drive 32 from a suitable prime mover (not shown) supplies the power for driving gears 29 and 27 to rotate discs 16 and 17. The gear housing can be water-cooled by jackets 33 if desired. Inert gas seals 34 and 35 can be provided. Likewise leakage about the shaft 15 is overcome by inert gas supplied under pressure by ducts 36. In the drawing each of the partitions 13 have two such ducts but it is contemplated that a greater or lesser number can be used. The gas supplied preferably is inert to the catalyst and reactants and can be, for example, air, steam, flue gas, nitrogen, gaseous hydrocarbons, etc.

Divider 37 defining a multiple inlet passage permits the transfer of at least two materials in metered quantities to be mixed in the receiving zone. It is apparent that more than two materials can be handled by providing additional dividers, which can be concentric with the shell 10, and by modifying the rotating ports in discs 16 and 17.

The granular material is delivered to the section exposed by the openings or ports 20 as the disc 16 rotates and the flow of catalyst is progressive to each successive section. When the openings 21 in the bottom disc 17 pass below the given section, the granular material drops into the receiving zone and the top of that given section is blocked by the upper disc 20. Thus the upper disc serves to seal against the delivery of more catalyst or passage of gas through the valve to the other vessel. Thus it will be seen that by my invention it is possible to remove solid particles from a chamber or deliver it to a chamber, or both, without attrition of the material and without the transfer of extraneous gaseous material except such as may be carried with the material into the sections or zones of the valve.

The various parts of my valve are of suitable material to withstand the working conditions. It is contemplated, for example, that the contacting moving parts will be of dissimilar metals to prevent seizure. Likewise, graphite can be used for moving parts.

The invention has been disclosed in a single embodiment but it is understood that it can take various forms and find numerous applications and that I do not intend to be limited except by the appended claims.

I claim:

1. A valve for continuously metering and transferring solid granular material in uniform amounts, said valve comprising a vertically elongated cylindrical shell having an inlet and an outlet, a plurality of longitudinal stationary chambers defined by a plurality of radial partitions in said shell, said partitions terminating in a hollow hub, sealing fluid ducts communicating with said hollow hub, a shaft disposed within said hub, movable discs fixed to opposite ends of said shaft and extending wholly within the flow area of said shell, ports in each of said discs, the area of each of said ports corresponding substantially to the cross sectional area of each of said chambers, and means for simultaneously and continuously rotating the discs in fixed relation with the ports in the upper and lower discs in non-registering position, whereby simultaneously at least one chamber is charged with said granular material, and at least one other filled chamber is discharged downwardly.

2. A valve comprising a cylindrical shell having an inlet passage and an outlet passage, a plurality of stationary elongated longitudinal chambers radially disposed within said shell, a plurality of partitions defining said chambers, said partitions terminating in a hollow hub, movable upper and lower discs abutting the upper and the lower ends of said chambers, said discs being rigidly attached to opposite ends of a rotatable shaft passing through said hollow hub, a plurality of ports in each of said discs spaced equidistant from the adjacent port, each of said ports having an area substantially equivalent to the cross sectional area of each of said chambers, a closure area between adjacent ports substantially greater than the area of one of said chambers, the ports in the respective discs being in non-registering position and means carried by the periphery of one of said discs for continuously rotating both of said discs whereby means is provided for discharging fluent solids from one of said chambers, for charging fluent solids to a second of said chambers and for maintaining an inactive zone between said charging and discharging zones.

LEO A. OHLINGER.